Patented Oct. 10, 1944

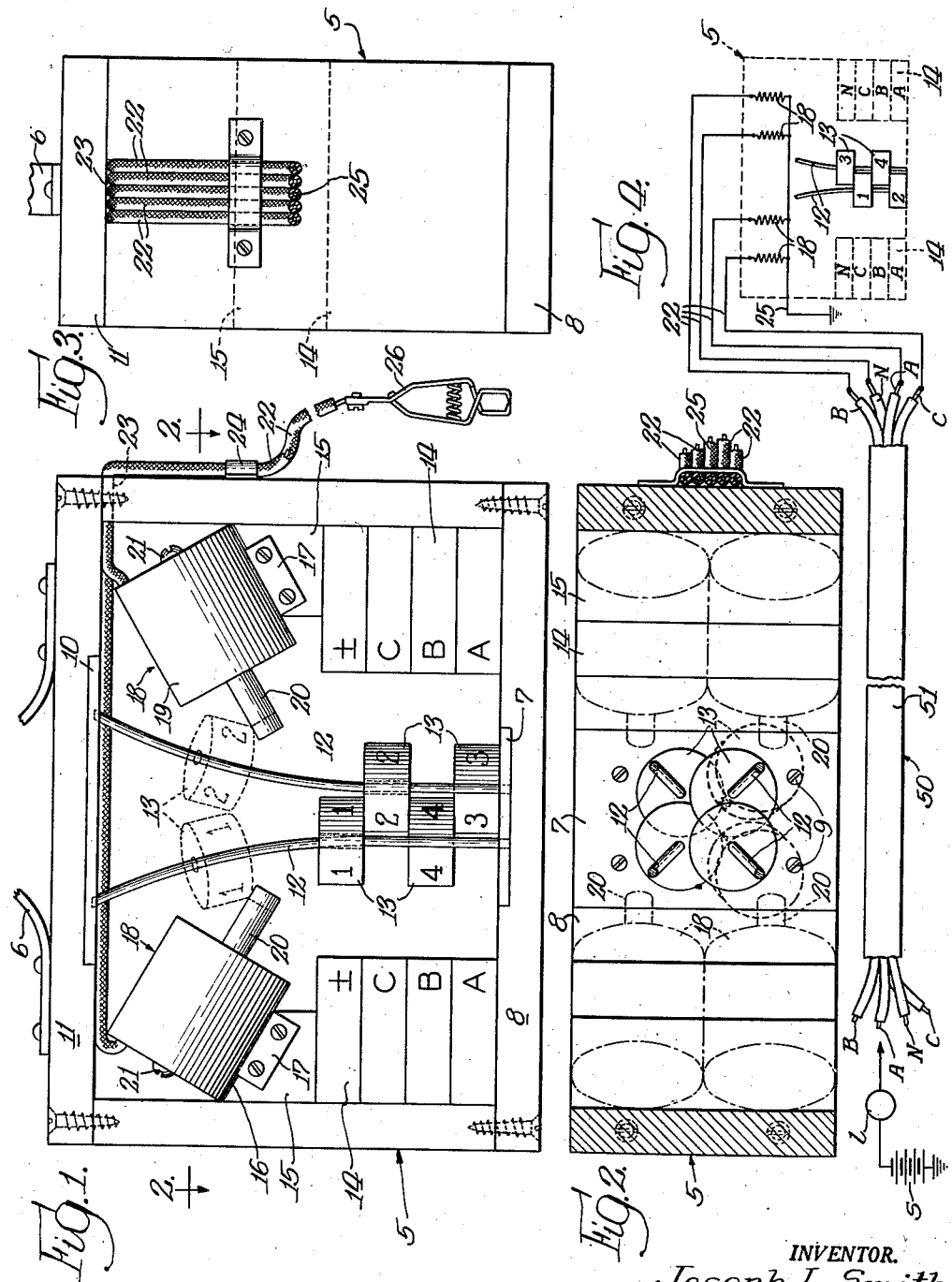

2,360,170

UNITED STATES PATENT OFFICE 2,360,170

CONDUCTOR IDENTIFIER

Joseph L. Smith, Chicago, Ill.

Application April 1, 1943, Serial No. 481,439

4 Claims. (Cl. 177—311)

This invention relates to identifying means, and has to do more particularly with means for identifying electric conductors. It is known to identify conductors by the use of electric light bulbs respectively connected to the conductors and lighted when the conductors are flashed by passing current therethrough, the conductors being flashed in predetermined order. That necessitates a person remaining at the receiving or identifying end of the circuit during flashing of the conductors, by an operator at the other end of the circuit. When the sending and receiving points are widely separated, such as, for example, when identifying the conductors of an underground power cable, the problem of arranging for the flashing of phases becomes rather involved, and if not handled properly may be hazardous for the person located in the manhole at the receiving end of the circuit. Should the operator at the other end of the cable make a switching error and energize the cable at full voltage, the man at the opposite or receiving end may be seriously burned. It is also known to use devices of the character referred to for identifying conductors extending through conduits within a building, it being necessary in using such a device that two operators be employed, one at the receiving end and the other at the opposite end of the circuit, for energizing or flashing the conductors in succession.

My invention is directed to means for identifying conductors, of such character that it is not necessary for anyone to be present at the receiving end of the circuit during the operation of flashing the conductors, thus avoiding the risk of a person at the receiving end being injured or burned should the operator at the other end of the circuit make an error and energize the line, such as a power line, at full line potential instead of regrounding the line after he has completed the phase sending or flashing operation. In that manner, all danger to the person receiving the phases is avoided, the identifying means of my invention being properly connected to the conductors before any switching or changing of connection is made at the sending end of the circuit. After that has been done, the person at the receiving end may leave the manhole, or other area in which the identifying device is disposed, and not return until after word has been received that the line has been regrounded or left in the same condition as it was prior to the phase flashing operation. More particularly, I provide means whereby the identity of the conductors, in the order in which they have been flashed, will be automtaically indicated and held, without anyone being present, so that upon completion of the flashing operation the conductors are identified in the sequence in which they have been flashed. More specifically, I provide a plurality of differently identified indicator members, one for each conductor to be identified, having a set position and a released position in which they are so arranged as to indicate the sequence in which they have been released, and electro-responsive means for holding the indicator members in their set position and for releasing them individually, responsive to flashing of the conductors in successive and predetermined order, and in the same sequence as that in which the conductors are flashed. I also preferably provide means marked to indicate the predetermined order or sequence of flashing the conductors, so disposed that each of the respective indicator members, when in its released position, is identified with its corresponding conductor.

A further advantage of the identifying device of my invention is that when used for identifying conductors in conduits within buildings and like structures, but one man is employed for flashing the conductors and identifying them, since the identifying means serves to identify the conductors automatically and in the sequence in which they have been flashed, thus providing a permanent record, until altered, by which the respective conductors may be identified. Further objects and advantages of my invention will appear from the detail description.

In the drawing:

Figure 1 is a side view of a conductor identifier embodying my invention;

Figure 2 is a sectional view, taken substantially on line 2—2 of Figure 1;

Figure 3 is an end view of the conductor identifier of Figure 1; and

Figure 4 is a diagrammatic view illustrating the manner in which the conductor identifier of my invention is used.

The conductor identifying device of my invention comprises a box-like frame 5, conveniently formed of wood, open at its sides and of rectangular shape in side view, this frame being provided with a carrying handle 6 suitably attached to the top thereof. A metal plate 7 is set into the upper face of the bottom wall 8 of frame 5, to which it is secured in a suitable manner, conveniently by means of screws 9. A metal plate 10 is set into and secured to top wall 11 of frame 5, at the under face of that wall, plate 10 being of considerably greater extent lengthwise of frame 5 than plate 7.

The plates 7 and 10 are disposed at the mid-portion of the bottom and top walls 8 and 11, respectively, of frame 5, and are connected by rods 12 disposed generally vertically, these rods being secured at their ends in the plates with their lower ends spaced equidistant from the center of wall 8, and their upper portions diverging upward and spaced equidistant from the center of wall 11. Rods 12 preferably are of circular cross section, as shown in Figure 2, and together provide a supporting and guide structure for indicator members in the form of discs 13 formed of any suitable material, conveniently of wood. The discs 13 are differently identified, for example, by being differently numbered, and are centrally bored, one of these discs being mounted on each of the rods 12 for sliding movement therealong. The discs 13 are of such diameter that when they are held in an upper or set position on the upper portions of the rods, as indicated in dotted lines in Figure 1, they clear each other so that when a disc is released it may slide freely downward along its associated rod independently of the other discs, and the lower portions of the rods 12 are substantially straight and so spaced that when the discs 13 are in their released or lowered positions, they are disposed in superposed overlapping relation, as shown in Figure 1.

A base block 14 of suitable material, preferably wood, is suitably secured in each lower corner of frame 5 and supports a mounting block 15, also preferably of wood, suitably secured thereto and to the end wall of the frame. The upper face 16 of each of the mounting blocks 15 is inclined downward and inward, as shown, providing an inclined seat for a mounting plate 17 of an electromagnet 18, plate 17 being secured to mounting block 15 in any suitable manner, conveniently by means of screws. There are four electromagnets 18, two mounted on each mounting block 15, side by side, as indicated in dot and dash lines in Figure 2. Each of the electromagnets 18 comprises an iron-clad solenoid 19 having a slidable steel core 20, movement of which into its outer or projected position is limited in a known manner, inward movement of this core into its attracted position being limited by a stop screw 21. The electromagnet 18 may be of any suitable known construction, and further description thereof is not necessary here. A flexible lead 22 is connected to one end of the winding of the respective electromagnets, these leads being led out through an opening 23, at the top of one end wall of frame 5, and being confined between the outer face of that wall and a clip 24 suitably secured to the latter. The other ends of the windings of the electromagnets 18 are connected to a common flexible ground lead 25, which also passes through opening 23 and the clip 24. Each of the leads 22 may be provided at its free end with a spring clamp 26, of any suitable known type, for connecting the leads to the conductors to be identified, and lead 25 may be provided at its end with a suitable clamp or other means for connecting it to a ground.

The device illustrated is suitable for identifying four conductors such as, for example, the phases of a four conductor underground power cable. Accordingly, there are four discs 13, one for each conductor to be identified, and there are four electromagnets 18, individual to the respective discs. Each of the blocks 14 is separated into four vertically arranged areas marked, from top to bottom, A, B, C, and with a positive sign and a negative sign. These areas indicate the order in which the phases are to be energized for identification, that is, the predetermined sequence of flashing of the conductors, previously referred to. It will be understood that the number of indicator members and associated electromagnets may be varied in number as desired, within limits. Likewise, the number of spaces or areas provided on the blocks 14, and the markings thereof may be varied.

In Figure 4 I have shown diagrammatically the method of identifying the conductors of a four conductor power cable, by means of the identifying device of my invention. The identifying device is placed adjacent one end of an underground cable 50 comprising a lead sheath 51 and a plurality of conductors extending therethrough, designated A, B, C, and N. The flexible leads 22 are differently identified in the same manner as and correspondingly to the discs 13; the lead 22 connected to the electromagnet controlling disc numbered 1 is also numbered 1, the lead 22 connected to the electromagnet controlling disc numbered 2 is also numbered 2, etc. If desired, the leads 22 and the discs 13 may be otherwise differently identified. Also, while it is preferred that the leads 22 be identified so as to be readily distinguished from each other, that is not essential, since the leads in practice are usually of not more than about six feet in length and may readily be traced to their respective electromagnets.

Referring further to Figure 4, it may be assumed that the cable 50 is an underground cable and that the identifying device is disposed within a manhole. The leads 22 are connected, by means of the spring clamps 26, to the conductors of the cable 50, lead 25 is grounded to the lead sheath 51 of the cable, or to any other suitable ground, and the indicator discs 13 are disposed in their set or upper positions, in which they are retained by the projected cores 20 of the electromagnets. The device is now set to receive phases, and all of the men leave the manhole and should not return thereto until after the identifying operation has been completed.

After the men have left the manhole, the operator at the other end of the line, at a station or a sub-station, is told to flash phases. He does so by applying a source of direct current at a potention of 110 volts, indicated by the storage battery s, between each conductor and ground in proper sequence, the order in which the conductors are flashed being A phase, B phase, C phase, and then neutral. A lamp l is connected in series with the battery or source s, and the phasing stick or point, which may be of any suitable known type, for connecting one side of the source s to the conductors of the cable in succession, the other side of the source of current s being grounded to the lead sheath of cable 50, or to any other suitable ground.

When potential is applied to the A phase conductor in the cable 50, the electromagnet 18 of the identifying device corresponding to the A phase conductor is energized and releases the corresponding disc 13 for movement of the latter to its released or lowered position. At the time that the clamps 26 are applied to the conductors of the cable, there is no way of knowing which phases these conductors represent. But the electromagnets 18 will be energized in the same sequence in which the conductors of the cable are flashed, so that the discs 13 will be released in the same sequence, and when in released or lowered position will be disposed in overlapping superposed relation, their positions providing a permanent record, until altered, of the order in which the discs 13 have been released. Since the conductors were flashed in the sequence above stated, the discs disposed in the order—2, 4, 1, and 3, indicate that the leads 22 connected to the corresponding electromagnets 18 are respectively connected to the A, B, C, and N phase conductors of the cable. In that manner the conductors are readily identified by reference to the discs 13, and their associated electromagnets and leads 22. In Figure 1 the discs are stacked in somewhat different order than in Figure 4, it being assumed in Figure 1 that the leads 22 corresponding to the electromagnets individual to the discs numbered 3, 4, 2, and 1, respectively, were respectively connected to the A, B, C, and neutral conductors, respectively, of the cable 50.

After the identifying operation has been completed, as above, the operator grounds the line and reports that it is ready to be again worked upon. After receiving this information, the workmen may go back into the manhole. The correct phases are then readily determined by noting the positions of the discs 13. In that connection, the provision of the marked areas on the blocks 14 is of material assistance since, as will be noted from Figure 1, by referring to the position of any one of the discs 13 the corresponding phase conductor is readily determined. Knowing the order in which the conductors are flashed, a workman could determine from the relative positions of the discs 13 which conductors the leads 22 were connected to, but it is desirable to provide the blocks 14 marked as above explained, with a view to reducing likelihood of error and facilitating determination of the respective conductors with a minimum of delay.

While the identifying device of my invention is particularly useful in connection with underground cable work, it is well suited for other uses, such as identifying cables passing through conduits within buildings and like structures. In such cases the manner of using the device is essentially the same as above described, except that there is no necessity for having an operator at one end of the line for flashing the conductors, in addition to a man at the receiving end, but one man being required. The operator first connects the flexible leads 22 to the conductors to be identified, grounding lead 25 to the conduit, or to any other suitable ground, and then returns to the other or sending end of the line, where he proceeds to flash the conductors from any suitable source of potential, such as a battery or dry cell, in predetermined sequence. That serves to release the discs 13 in the same sequence in which the conductors have been flashed, and these discs provide, by their relative positions, a permanent record, until altered, of the sequence in which the conductors have been flashed.

Referring to Figure 1, two of the discs 13 are shown in their raised or set positions, in which they are held by the projected cores 20 of the corresponding electromagnets 18. When the winding of an electromagnet 18 is energized, its core 20 is attracted so as to be moved inward into the attracted position indicated by dotted lines, thereby being withdrawn from beneath the corresponding disc 13 and releasing the latter for downward movement. The electromagnets, including the movable cores thereof, thus provide electroresponsive means having movable elements normally serving to hold the discs 13 in their set position and moved, responsive to energizing of the electroresponsive means, into position to release the discs. Within the broader aspects of my invention, any suitable form of electroresponsive means may be utilized for holding the discs in set position and releasing them, the particular means shown being by way of example only. It will also be understood that, within the broader aspects of my invention, any other suitable means may be provided for guiding the discs 13 or indicator members from their set positions to released positions, and disposing them in their latter positions in such manner as to indicate the conductors to be identified in the same order as that in which such conductors have been flashed.

As above indicated, and as will be understood by those skilled in the art, changes in construction and arrangement of parts of my invention may be resorted to without departing from the field and scope of the same, and I intend to include all such variations, as fall within the scope of the appended claims, in this application in which the preferred form only of my invention has been disclosed.

I claim:

1. In means for identifying a plurality of conductors, a guide structure comprising a plurality of upwardly extending guide elements corresponding in number to the conductors to be identified, a plurality of indicator members respectively mounted on said guide elements for sliding movement therealong, said members having an upper set position and being movable downward along said guide structure into a lower released position, said guide structure comprising means for disposing said indicator members in order in their released positions indicative of the order in which they have been released, and electroresponsive means individual to the respective indicator members for holding them in set position when said electroresponsive means is deenergized and releasing them individually for movement to released position responsive to energizing of said electroresponsive means.

2. In means for identifying a plurality of conductors, a guide structure comprising a plurality of upwardly extending guide elements corresponding in number to the conductors to be identified, a plurality of indicator members respectively mounted on said guide elements for sliding movement therealong, said members having an upper set position and being movable downward along said guide structure into a lower released position, said guide structure comprising means for disposing said indicator members in superposed relation in their released positions indicative of the order in which they have been released, and electroresponsive means individual to the respective indicator members for holding them in set position when said electroresponsive means is deenergized and releasing them individually for movement to released position responsive to energizing of said electroresponsive means.

3. In means for identifying a plurality of conductors, a plurality of guide rods corresponding in number to the conductors to be identified, said rods being disposed generally vertically with their upper portions diverging upward, a plurality of indicator members respectively mounted on said rods slidable therealong, said members being of a size to clear each other when in a set position at the upper portions of the rods for independent movement downward along the rods into lower released position but of a size to be disposed in overlapping superposed relation when in their released positions, and electroresponsive means individual to the respective indicator members for holding them in their set positions when said means is deenergized and releasing them individually when said means is energized.

4. In means for identifying a plurality of conductors, a plurality of guide rods corresponding in number to the conductors to be identified, said rods being disposed generally vertically with their upper portions diverging upward, a plurality of indicator members respectively mounted on said rods slidable therealong, said members being of a size to clear each other when in a set position at the upper portions of the rods for independent movement downward along the rods into lower released position but of a size to be disposed in overlapping superposed relation when in their released positions, a marker block adjacent the lower portions of said rods having areas disposed substantially in the planes of the respective indicator members, when the latter are in their lower released positions, said areas being marked successively to indicate the order of flashing of the conductors, and electroresponsive means individual to the respective indicator members for holding them in their set positions when said means is deenergized and releasing them individually when said means is energized.

JOSEPH L. SMITH.